(12) United States Patent
Matsuda et al.

(10) Patent No.: US 6,721,113 B2
(45) Date of Patent: Apr. 13, 2004

(54) METHOD OF RECOGNIZING MASTER DISK POSITIONING MARK

(75) Inventors: Nobuhide Matsuda, Hirakata (JP); Akira Saito, Kawasaki (JP)

(73) Assignees: Matsushita Electric Industrial Co., Ltd., Osaka (JP); Fuji Electric Co., Ltd., Kanagawa (JP)

(*) Notice: Subject to any disclaimer, the term of this patent is extended or adjusted under 35 U.S.C. 154(b) by 359 days.

(21) Appl. No.: 09/878,925

(22) Filed: Jun. 13, 2001

(65) Prior Publication Data

US 2002/0015246 A1 Feb. 7, 2002

(30) Foreign Application Priority Data

Jun. 13, 2000 (JP) .......................... 2000-177506

(51) Int. Cl.[7] .................................. G11B 5/86
(52) U.S. Cl. .................... 360/15; 360/77.03; 360/78.11
(58) Field of Search .............................. 360/15, 16, 17, 360/71, 72.1, 77.03, 78.11; 369/43, 270, 282; 356/399; 250/570, 559.44, 559.3, 559.29, 559.09, 559.01

(56) References Cited

U.S. PATENT DOCUMENTS 3,869,711 A * 3/1975 Bernard .................... 360/17
4,954,065 A * 9/1990 Shindo .................... 425/175
6,347,016 B1   2/2002 Ishida et al.

FOREIGN PATENT DOCUMENTS

JP   2000-067433 A   3/2000
JP   2001-351232 A   12/2001

* cited by examiner

*Primary Examiner*—Alan T. Farber
(74) *Attorney, Agent, or Firm*—Venable LLP; Michael A. Sartori; Daniel G. Vivarelli

(57) ABSTRACT

A positioning mark of a soft magnetic film is provided at the center of a master disk, and a beam from a light source irradiates the position of the mark. When a optical reception sensor using a CCD recognizes the mark, the recognizability of the positioning mark can be improved by using a wavelength selective filter or a laser as the light source. Additionally, the recognizability of the positioning mark can be improved by forming the positioning mark using a material other than a soft magnetic material.

6 Claims, 11 Drawing Sheets

INITIAL DEMAGNETIZING PROCESS

PROCESS OF ALIGNING MASTER DISK

PROCESS OF WRITING TRANSFER PATTERN

INITIAL DEMAGETIZING PROCESS

PROCESS OF WRITING TRANSFER PATTERN

METHOD OF RECOGNIZING MASTER DISK POSITIONING MARK

This application is based on Patent Application No. 2000-177506 filed Jun. 13, 2000 in Japan, the content of which is incorporated hereinto by reference.

BACKGROUND OF THE INVENTION

1. Field of the Invention

The present invention relates to a method of writing a data write/read head positioning servo signal written to the magnetic recording disk by the magnetic transfer technology in the hard disk drive (HDD) using as a recording material a magnetic film which is normally used as a mainstream of an external storage device of a computer, and more specifically to a method of recognizing a master disk positioning mark.

2. Description of the Prior Art

It is well known that a hard disk drive device records and reads data while a magnetic head is floating while keeping interval of several tens nano-meter on the revolving magnetic recording disk using a floating mechanism referred to as a slider. The bit information on the magnetic disk is stored on the data track concentrically provided on the disk, and the data record/read head records and reproduces data on the target data track on the disk surface by quickly moving and positioning the head.

On the magnetic recording disk surface, a positioning signal (servo signal) for detection of the relative position between the head and the data track is concentrically written, and the head for recording and reproducing data detects the position of itself at predetermined time intervals. After incorporating the recording disk into the HDD device, the servo signal is written using a dedicated device referred to as a servo track writer so that the center of the servo write signal cannot be deviated from the center of the disk (or the center of the orbit of the head).

Currently, the recording disk has the recording density of about 20 Gbits/in$^2$ at the development stage, and the recording capacity increases at the rate of 60% annually. With the above mentioned progress, the density of a servo signal for detection of the position of the head itself also increases, and the writing time of a servo signal has been increased year by year. An increasing writing time of the servo signal is a main factor of reducing the productivity of the HDD, thereby increasing the entire cost.

Recently, to replace the system of writing the servo signal using the signal write head of the above mentioned servo track writer, the technology has been developed to collectively write servo signals by a magnetic transfer, and thereby remarkably shorten the servo information writing time. FIGS. 7A, 7B, 7C, 8A and 8B illustrate the magnetic transfer technology.

FIG. 7A shows the process of moving a permanent magnet on the surface of a magnetic recording disk 3 while keeping a predetermined interval (1 mm or shorter). The arrow recorded on the magnetic layer shown in FIG. 7A shows a moving path of the permanent magnet, and the magnetic layer is evenly magnetized radiantly. This process is referred to as an initial demagnetizing process.

FIG. 7B shows the process of aligning a magnetic transfer master disk 7 (hereinafter referred to as a master disk) by setting it on the magnetic recording disk 3.

FIG. 7C shows the magnetic transfer process performed by setting the master disk 7 as choereing the surface of the magnetic recording disk 3 and moving the magnetic transfer permanent magnet along the moving path (indicated by the arrow shown in FIG. 7C).

FIG. 8A shows the initial demagnetizing process. The process of a permanent magnet 42 of a head 41 moving on the surface of a magnetic recording disk 3 while keeping a predetermined interval (1 mm or shorter) is shown from the sectional portion of a substrate 31. A magnetic layer 32 filmed on the substrate 31 is not initially magnetized in a predetermined direction, but can be magnetized in a predetermined direction by a magnetic field leaking from the gap of the permanent magnet 42.

FIG. 8B shows a transfer pattern writing process for performing a magnetic transfer. As shown in FIG. 8B, the master disk 7 has the structure of a soft magnetic film 8 (Co type soft magnetic film in FIG. 8B) embedded into the surface of a silicon substrate 71 touching the surface of a medium. As shown in FIG. 8B, if there is the substrate 71 embedded a pattern of the soft magnetic film 8 between the permanent magnet 42 of the head 41 and the magnetic recording disk 3, the magnetic field (the direction of the transfer signal write magnetic field is opposite the direction of the demagnetized field) leaking from the permanent magnet 42 and passing through the silicon substrate 71 can pass through the silicon substrate 71 again and magnetize the magnetic layer 32 of the magnetic recording disk 3 at the point where there is no soft magnetic film 8, but it passes through the soft magnetic film 8 at the point where there is a soft magnetic pattern 8 such that a magnetic path can be formed with smaller magnetic resistance. Therefore, at the point where there is the soft magnetic film 8, the magnetic field leaking from the silicon substrate 71 is small, and no magnetic write is newly made. With the above mentioned mechanism, a magnetic transfer of a servo signal is performed.

To perform such above mentioned magnetic transfer, it is necessary for the center of the servo pattern (soft magnetic pattern embedded into the surface of the master disk) embedded into the master disk 7 to match the center of the magnetic medium 3 (magnetic recording disk). To make these centers match each other, it is necessary to determine the positions of the center of the magnetic medium 3 and the center of the servo pattern on the master disk 7 respectively. The method of confirming the central position of the magnetic medium 3 can be realized by revolving the medium held by a chuck with a laser light illuminated on the outer edge of the medium, and determining the amount of deviation of the center of the chuck from the center of the medium based on the variation of the reflected light from the outer edge.

FIG. 9 illustrates the method of recognizing the position of the center of the soft magnetic pattern 8 on the master disk 7 by the conventional technology. The master disk 7 is moved closer to the magnetic recording disk 3 held by a chuck 4, the position of the master disk 7 is recognized using a positioning mark 9 (a circular pattern (200–300 $\mu$m$\phi$) having a simple plane form, a cross pattern, etc. (200–300 $\mu$m square)) provided at the center of the master disk 7 immediately before the magnetic medium 3 touches the master disk 7, and the position of the master disk 7 is adjusted such that the center of the magnetic medium 3 can match the center of the master disk 7, thereby setting the magnetic medium 3 closely touching the master disk 7.

Practically, as shown in FIG. 9, a small incandescent lamp 1 (for example, a halogen lamp) irradiates the vicinity of the positioning mark 9 from behind the chuck 4, a CCD camera 2 receives the reflected light from the positioning mark 9, and an obtained electric signal is processed into an image, thereby recognizing the position of the master disk 7.

The chuck 4 has a hollow structure, and the magnetic medium 3 is donut-shaped with an open hole at the center. Therefore, the light from behind the magnetic medium 3 can easily and directly reach the surface of the master disk 7. Inside the portion indicated by numeral 10 of the chuck 4 is hollow. Since the material (Co type alloy) of the positioning mark 9 and the material (single crystal silicon) of the substrate have different reflectance, the position of the positioning mark 9 can be easily recognized.

FIGS. 10A to 10D are sectional views of the process for forming the soft magnetic embedding patterns 8 and 9 into the surface of the silicon substrate 71 of the master disk 7. Described below is each of the processes.

FIG. 10A shows the process of applying up to 1 μm of photo resist 19 onto the silicon substrate 71, and then performing exposing and developing processes using a photo mask. The pattern of the photo resist 19 after the development as shown in FIG. 10A is an inverted pattern of the final embedded soft magnetic pattern 8.

In the process shown in FIG. 10B, the surface of the silicon substrate 71 is etched by about 500 nm by using of the reactive ion etching method as shown in FIG. 10B.

In the process shown in FIG. 10C, a Co type alloy is formed as a soft magnetic film in the sputtering method. The thickness of the film is 500 nm to allow embedding as far as the etched portion on the surface of the silicon. Since the flying direction of the sputtered molecule (Co type alloy molecule) contributing to the growth of the film is controlled to be vertical to the surface of the silicon substrate 71, there arises no growth of the soft magnetic film vertical to the surface of the silicon substrate 71 as shown in FIG. 10C.

In the process shown in FIG. 10D, the substrate is soaked in a resist solvent to be dissolved. Thus, since the soft magnetic film on the solved resist is also washed away, the sectional form as shown in FIG. 10D with only the soft magnetic embedded patterns 8 and 9 remaining is obtained.

The method of positioning the center of the master disk 7 and the center of the magnetic medium 3 has been described above by referring to the basic configuration of the master disk. In the actual transfer process, a DLC (Diamond-like carbon) film is formed on the surface of the master disk 7 as a protective film (about 30 nm) for the purpose of extending the life of the master disk 7. In the master disk having the DLC film, the difference between the intensity of the reflected light from the positioning mark 9 and the reflected light from the silicon substrate 71 is small, and thereby it arises the problem to be solved that the positioning mark 9 cannot be recognized in the above mentioned conventional technology.

FIGS. 11A and 11B illustrate the problem above mentioned to be solved by the present invention. By referring to FIGS. 11A and 11B, the intensity of the reflected light from the master disk 7 is compared depending on the existence/non-existence of a DLC film.

In the master disk 7 having no DLC film formed as shown in FIG. 11A, assuming that the intensity of reflected lights 14 and 15 obtained by injecting a light 13 having the intensity of $I_0$ to the surface of the silicon substrate 71 and the surface of the soft magnetic film 9 of the master disk 7 is respectively $I_{S1}$ and $I_{M1}$, the ratio of the reflected light 14 from the surface of the silicon substrate 71 to the reflected light 15 from the surfaces of the soft magnetic films 8 and 9 can be expressed by $I_{S1}/I_{M1}$.

On the other hand, in the master disk 7 having a DLC film 18 formed as shown in FIG. 11B, the reflected light obtained by irradiating the light 13 having the intensity $I_0$ on the surface of the silicon substrate 71 of the master disk 7 contains the intensity $I_{S2}$ of the light 14 which reaches the surface of the silicon substrate 71 and is reflected thereby and the intensity $I_C$ of a light 16 reflected by the surface of the DLC film 18. The intensity $I_{S2}$ of the reflected light 14 shown in FIG. 11B, when compared with the intensity $I_{S1}$ of the reflected light 14 shown in FIG. 11A when there is no DLC film 18, is absorbed and scattered and therefore more attenuated in the process of the incident light passing through the DLC film 18. This holds true with the $I_{M2}$ of the light 15 reflected by the soft magnetic films 8 and 9. Therefore, the ratio of the intensity of the reflected light from the surface of the silicon substrate 71 to the intensity of the reflected light from the soft magnetic films 8 and 9 when there is the DLC film 18 is expressed by $(I_{S2}+I_C)/(I_{M2}+I_C)$. Therefore, the ratio of the intensity of the reflected light from the surface of the silicon substrate 71 to the intensity of the reflected light from the soft magnetic films 8 and 9 when there is the DLC film 18 is normally closer to 1 than the ratio $I_{S1}/I_{M1}$ when there is no DLC film. With an increasing value of $I_C$, the ratio of the intensity of the reflected light furthermore reaches asymptotically 1 (where the intensity of the reflected light from the silicon substrate surface is equal to the intensity of the reflected light from the soft magnetic film surface, and they cannot be distinguished from each other).

To improve the recognizability of the positioning mark 9, the value of $(I_{S2}+I_C)/(I_{M2}+I_C)$ is to be set to a value apart from 1.

SUMMARY OF THE INVENTION

To solve the above mentioned problems, the purpose of the present invention aims at improving the recognizability of the positioning mark by setting closer to zero the intensity $I_C$ of the reflected light from the DLC film on the upper surface of the master disk, and by setting larger the ratio of the intensity $I_{S2}$ of the reflected light from the surface of the lower silicon substrate of the master disk to the intensity $I_{M2}$ of the reflected light from the positioning mark.

The intensity of the reflected light from the silicon substrate surface and the intensity of the reflected light from the soft magnetic film surface refer to a function of an optical wavelength individually. The first aspect of the present invention is based on this point, and the value of $(I_{S2}+I_C)/(I_{M2}+I_C)$ is set a value apart from 1 to improve the recognizability of a positioning mark by limiting a light wavelength for using the positioning mark by limiting a light wavelength for using the positioning mark recognition to a predetermined wavelength range, in other words, by selectively using the wavelength which allows as smaller as possible for the intensity $I_C$ of the reflected light from the DLC film on the upper surface of the master disk, and a higher ratio of the reflected light intensity $I_{S2}$ of the light reaching the surface of the lower substrate of the master disk and being reflected thereby to the intensity $I_{M2}$ of the light reflected by the positioning mark.

It is desired to select the range of the wavelength of an incident light to an optical reception sensor using a wavelength selection filter.

In addition, it is desired to emit the light from the light source of a limited wavelength area to the positioning mark, and input the reflected light to the optical sensor.

Furthermore, it is desired to emit the light from the polarized light source of a limited wavelength area to the positioning mark, and input the reflected light to the optical sensor through a polarization filter.

To attain the above mentioned purpose, the second aspect of the present invention uses different materials between the positioning mark formed for position recognition on the master disk and the soft magnetic pattern in order to set the intensity $I_C$ of the reflected light from the DLC film on the upper surface of the master disk closer to zero, and to set a higher ratio of the reflected light intensity $I_{S2}$ of the light reaching the surface of the lower substrate of the master disk to the intensity $I_{M2}$ of the light reflected by the positioning mark.

Then, the process of forming a film for a positioning mark is added to the process of forming a film for a soft magnetic mark in the master disk producing process. In this process of forming a film for a positioning mark, it is desired to select as the material of a positioning mark a material having reflectance quite different from the reflectance of the substrate of the master disk from among various materials indicating no soft magnetism.

According to the present invention, lower reflection from the DLC film, which is a protective film for the master disk, and the largest difference in reflected light intensity between the light from the surface of the master disk substrate (silicon substrate) and the light from the surface of the positioning mark can be obtained by limiting the light for recognition of the positioning mark to a specific range of a wavelength. Thus, the recognizability of a positioning mark can be successfully improved.

Furthermore, according to the present invention, the recognizability of a positioning mark can be improved by using the difference in polarization between the lights reflected from different materials in addition to use a laser light as a light source.

In addition, according to the present invention, the material of a positioning mark can be selected based on that its reflectance can be quite different from the reflectance of the master disk substrate by setting the positioning mark patterning process independent of the soft magnetic film patterning process.

The above and other objects, features and advantages of the present invention will become more apparent from the following description of embodiments thereof taken in conjunction with the accompanying drawings.

DETAILED DESCRIPTION OF PREFERRED EMBODIMENTS

First Embodiment

Figure 1:
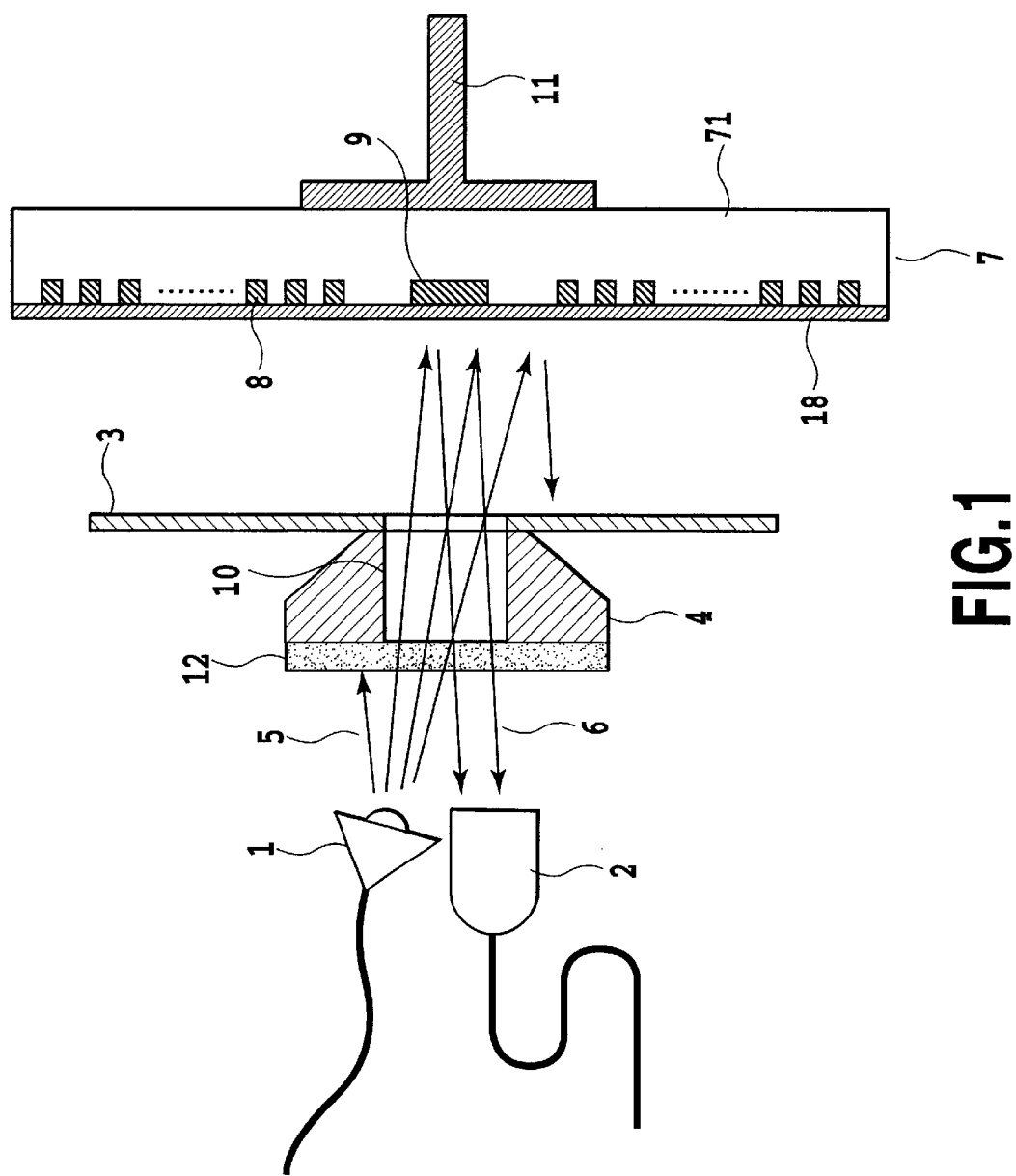
FIG. 1 shows an example of the configuration of a master disk positioning mark recognition apparatus according to the first embodiment of the present invention based on the first aspect of the present invention.

FIG. 1 shows an example of the configuration according to the first embodiment of the present invention based on the first aspect of the present invention. Reference numeral 1 denotes a light source. Reference numeral 2 denotes an optical reception sensor (CCD optical reception element). Reference numeral 3 denotes a magnetic medium (magnetic recording disk). Reference numeral 4 denotes a medium holding chuck. Reference numeral 5 denotes an irradiant light to the vicinity of a positioning mark. Reference numeral 6 is a reflected light from the vicinity of the positioning mark. Reference numeral 71 denotes a silicon substrate of a master disk 7. Reference numeral 8 denotes an embedded soft magnetic layer to which a servo pattern is written. Reference numeral 9 denotes the positioning mark. Reference numeral 10 denotes a hollow of the chuck. Reference numeral 11 denotes a master disk holding shaft. Reference numeral 12 denotes an optical filter. Reference numeral 18 denotes a DLC (Diamond-Like Carbon) film.

As shown in FIG. 1, the present embodiment includes the IR (infrared) cut filter 12 for cutting the wavelength equal to or longer than 700 nm on the reverse side of the medium holding chuck 4. Pure Co is used as the soft magnetic layer 8. The thickness of the soft magnetic layer 8 is 500 nm.

Second Embodiment

Figure 2:
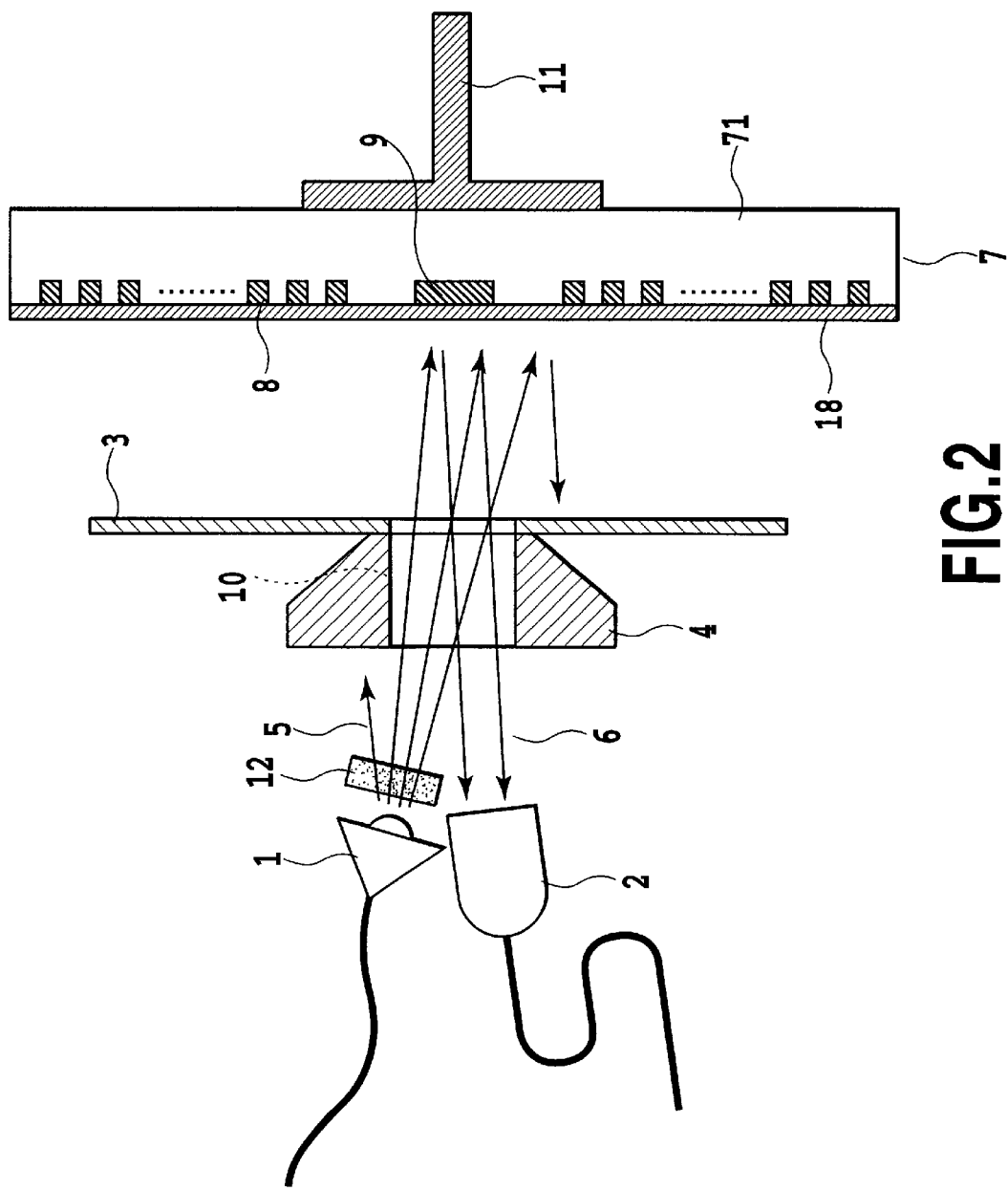
FIG. 2 shows an example of the configuration of a master disk positioning mark recognition apparatus according to the second embodiment of the present invention based on the first aspect of the present invention.

FIG. 2 shows an example of the configuration according to the second embodiment of the present invention based on the first aspect of the present invention. As shown in FIG. 2, according to the present embodiment, the above mentioned IR cut filter 12 for cutting the wavelength equal to or longer than 700 nm is arranged immediately before the light source 1 so that only the light from the light source 1 can pass through the optical filter 12.

Third Embodiment

Figure 3:
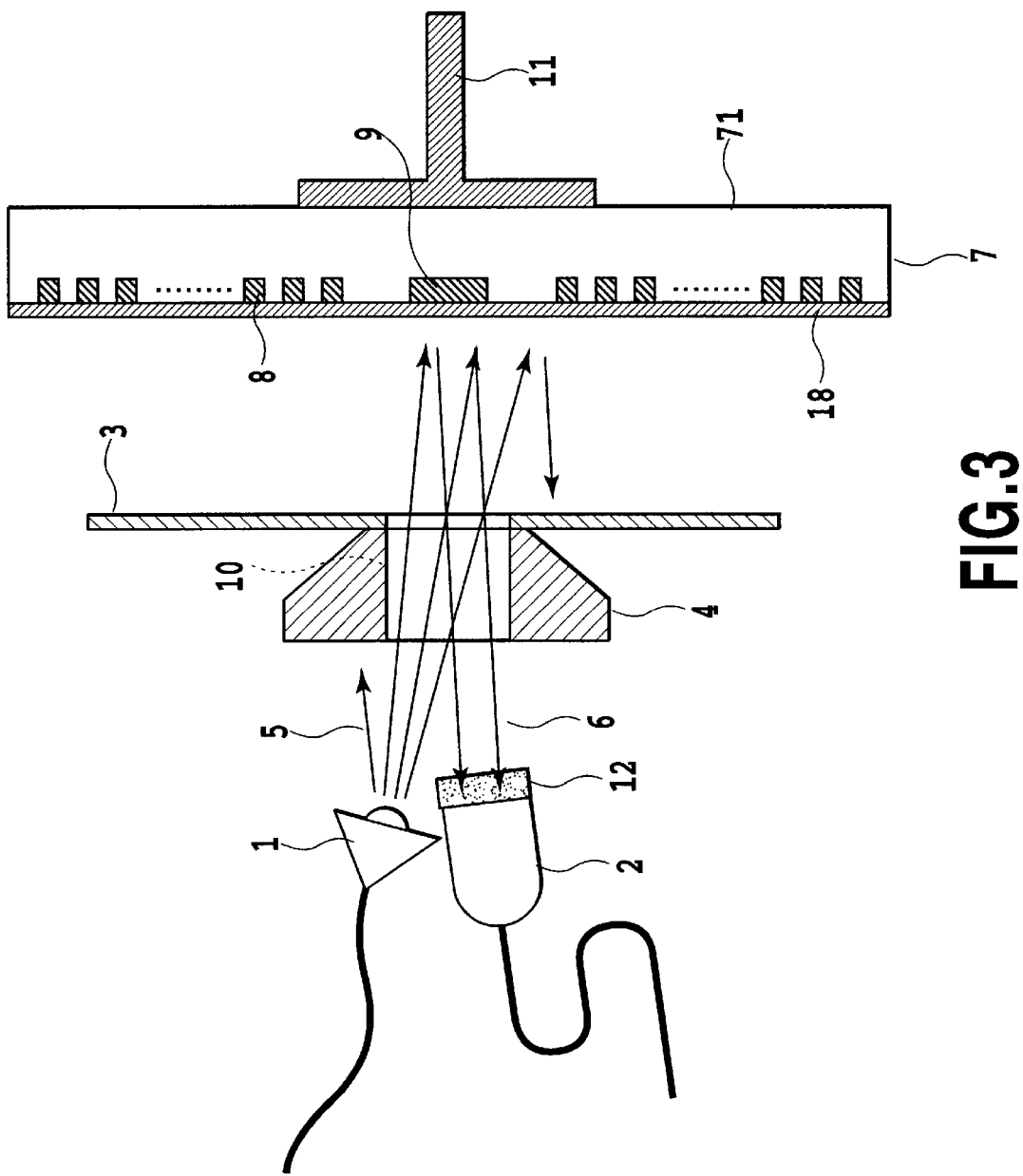
FIG. 3 shows an example of the configuration of a master disk positioning mark recognition apparatus according to the third embodiment of the present invention based on the first aspect of the present invention.

FIG. 3 shows an example of the configuration according to the third embodiment of the present invention based on the first aspect of the present invention. As shown in FIG. 3, according to the present embodiment, the above mentioned IR cut filter 12 for cutting the wavelength equal to or longer than 700 nm is placed on the optical reception surface of the optical reception sensor (CCD optical reception element) 2 so that only the reflected light 6 from the vicinity of the positioning mark 9 can pass through the optical filter 12.

In any case according to the embodiments shown in FIGS. 1 to 3, a small incandescent lamp (e.g. halogen lamp) of W is used as a light source 1.

Fourth Embodiment

Figure 4:
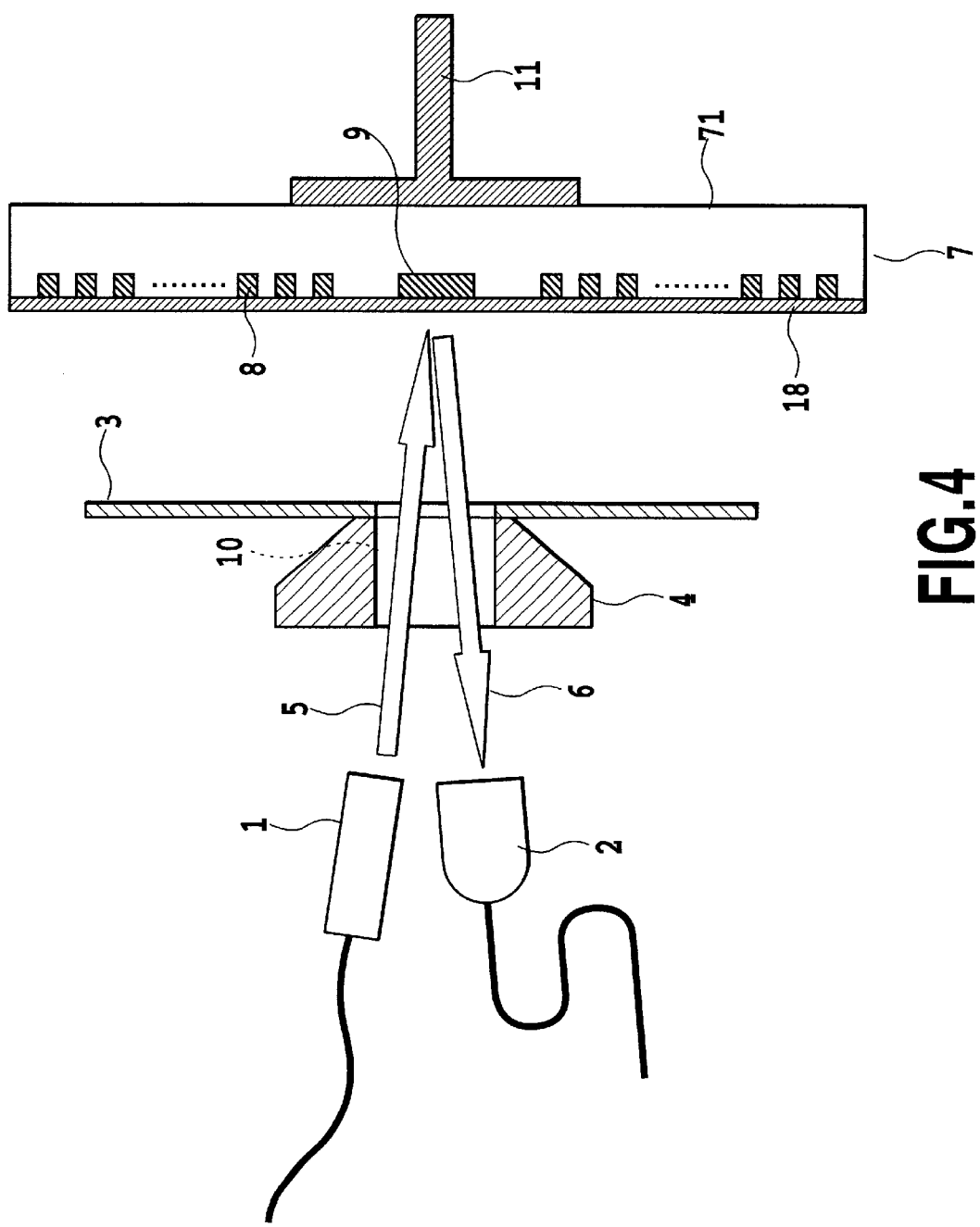
FIG. 4 shows an example of the configuration of a master disk positioning mark recognition apparatus according to the fourth embodiment of the present invention based on the first aspect of the present invention.

FIG. 4 shows an example of the configuration according to the fourth embodiment of the present invention base on the first aspect of the present invention. Unlike the first to third embodiments of the present invention in which the range of the frequency of a light irradiating the vicinity of the positioning mark 9 is selected using the optical filter 12, a laser is used as the light source 1 in the present embodiment as shown in FIG. 4.

A beam of an Ar ion laser having the wavelength of 514.5 nm is used as the output beam of the laser 1. The optical output of the Ar ion laser is several mW, and the diameter of the incident beam is extended into about 2 cm using a beam expander (not shown in FIG. 4).

Described below are the operation and the effect of the above mentioned first to fourth embodiments.

As described above, the reflection from the DLC film 18 which is a protection film for the master disk 7 can be minimized, and the difference in reflected light intensity between the reflected light form the surface of the master disk substrate (silicon substrate) 71 and the reflected light from the surface of the positioning mark 9 can be maximized by limiting the light for recognition of a positioning mark to a specific range of the wavelength. Thus, the recognizability of the positioning mark can be successfully improved.

Using a silicon substrate as the silicon substrate 71, pure Co as the material of the positioning mark 9, a halogen lamp as the light source 1, and a filter for cutting the wavelength equal to or longer than 700 nm as the optical filter 12 shown in the first to third embodiments, considering the different from 1 to the optical intensity ratio $(I_{S2}+I_C)/(I_{M2}+I_C)$ of the reflected light 14 from the surface of the silicon substrate 71 to the reflected light 15 from the soft magnetic film 9 when there is the DLC film 18, a larger difference by about 30% improved recognizability are detected when the optical filter 12 is used as compared with the case in which no filter is used.

In the fourth embodiment, also when an Ar ion laser having the wavelength of 514.5 nm is used as the light source 1, a silicon substrate is used as the silicon substrate 71, and pure Co is used as the material of the positioning mark 9, the recognizability is apparently improved as in the first to third embodiments.

Fifth Embodiment

Figure 5:
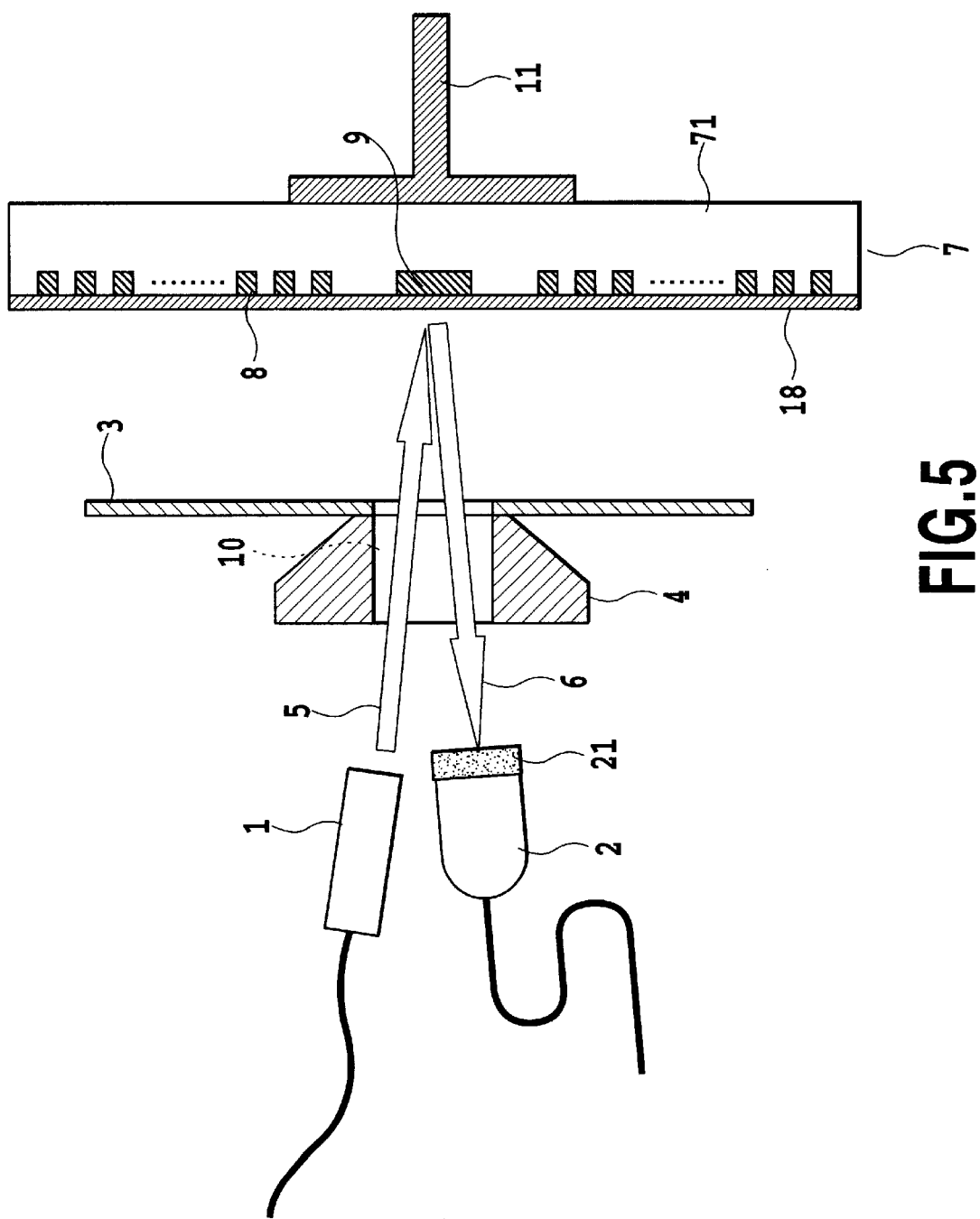
FIG. 5 shows an example of the configuration of a master disk positioning mark recognition apparatus according to the fifth embodiment of the present invention based on the first aspect of the present invention.

FIG. 5 shows an example of the configuration according to the fifth embodiment of the present invention based on the first aspect of the present invention. As shown in FIG. 5, according to the present embodiment, the laser used in the fourth embodiment is used as the light source 1, and a polarization filter 21 is provided before the optical reception sensor 2.

According to the fifth embodiment of the present invention, the recognizability of a positioning mark can be improved by using the difference in polarization of the reflected lights from different materials in addition to use the laser light as the light source 1.

Sixth Embodiment

FIGS. 6A to 6E show the process of producing a master disk according to the sixth embodiment of the present invention based on the second aspect of the present invention. Especially, FIGS. 6A to 6E is a sectional views showing the process of patterning a positioning mark before forming an embedded soft magnetic layer by the conventional technology. In this example, reference numeral 71 denotes a silicon substrate of the master disk 7, reference numeral 8 denotes an embedded soft magnetic layer to which a servo pattern is written, reference numeral 9 denotes a positioning mark, reference numeral 19 denotes a photo resist, and reference numeral 20 denotes an aluminum silicide film (thin film for a positioning mark).

Figure 6A:
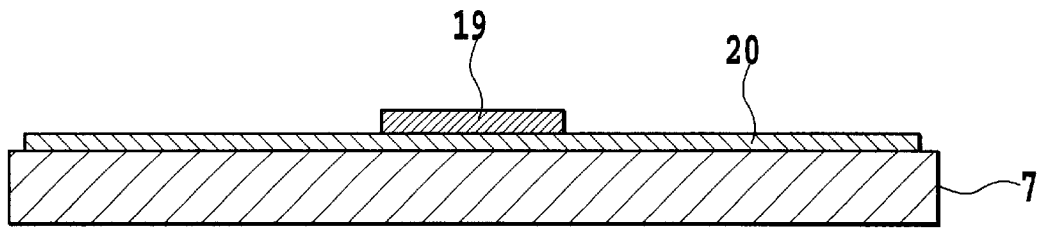
FIGS. 6A to 6E are sectional views of the process of producing a master disk according to the sixth embodiment of the present invention based on the second aspect of the present invention.
Figure 6B:
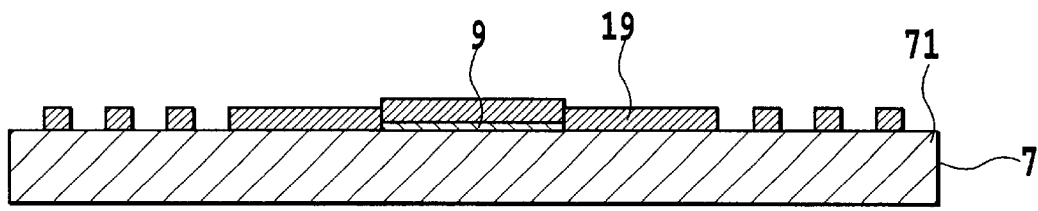
Figure 6C:
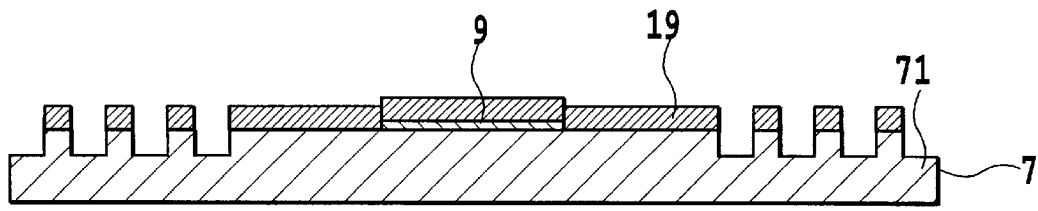
Figure 6D:
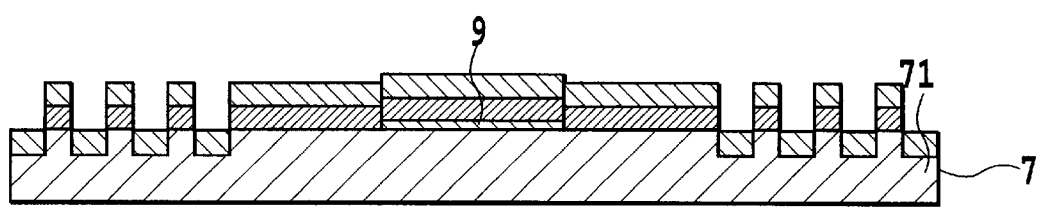
Figure 6E:
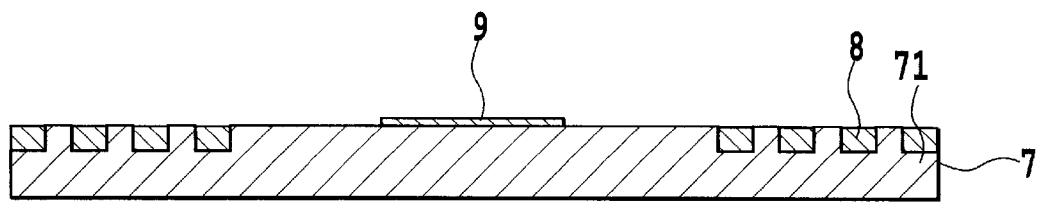
Figure 7A:
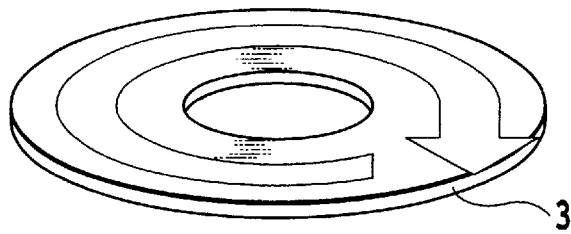
FIGS. 7A to 7C are oblique views of the process of a magnetic transfer by the conventional technology.
Figure 7B:
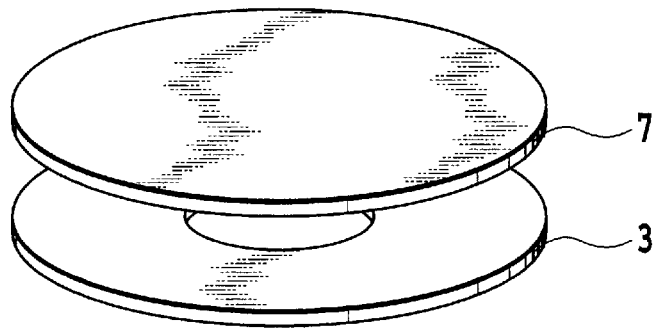
Figure 7C:
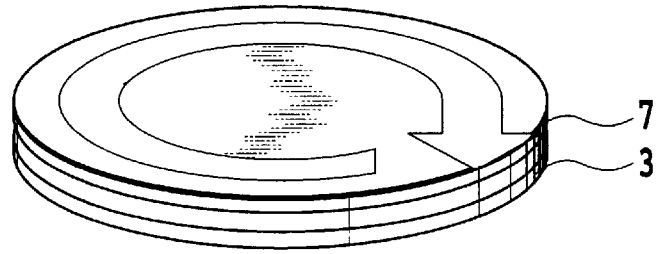
Figure 8A:
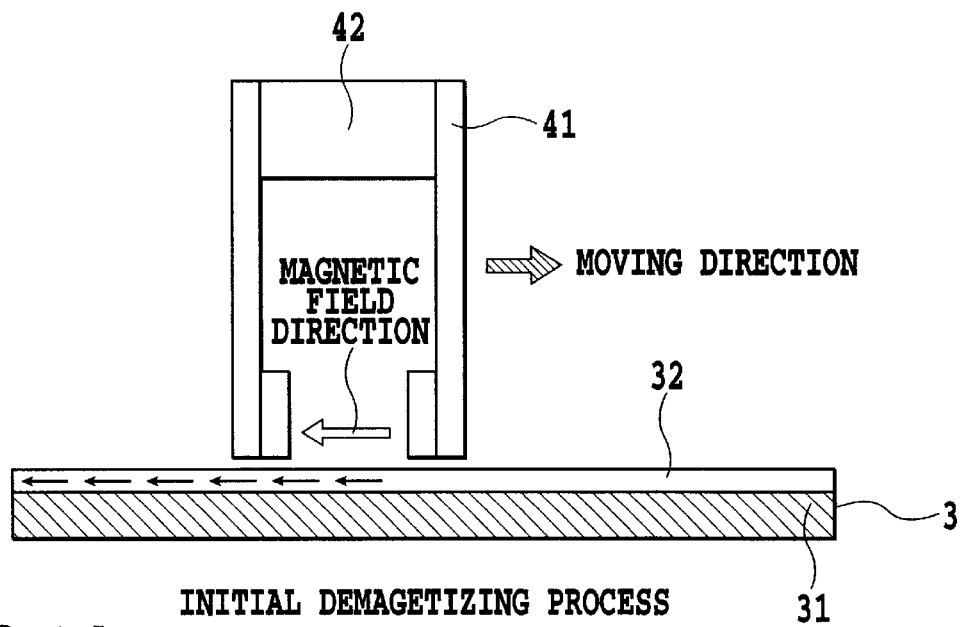
FIGS. 8A and 8B are sectional views of the process of a magnetic transfer by the conventional technology.
Figure 8B:
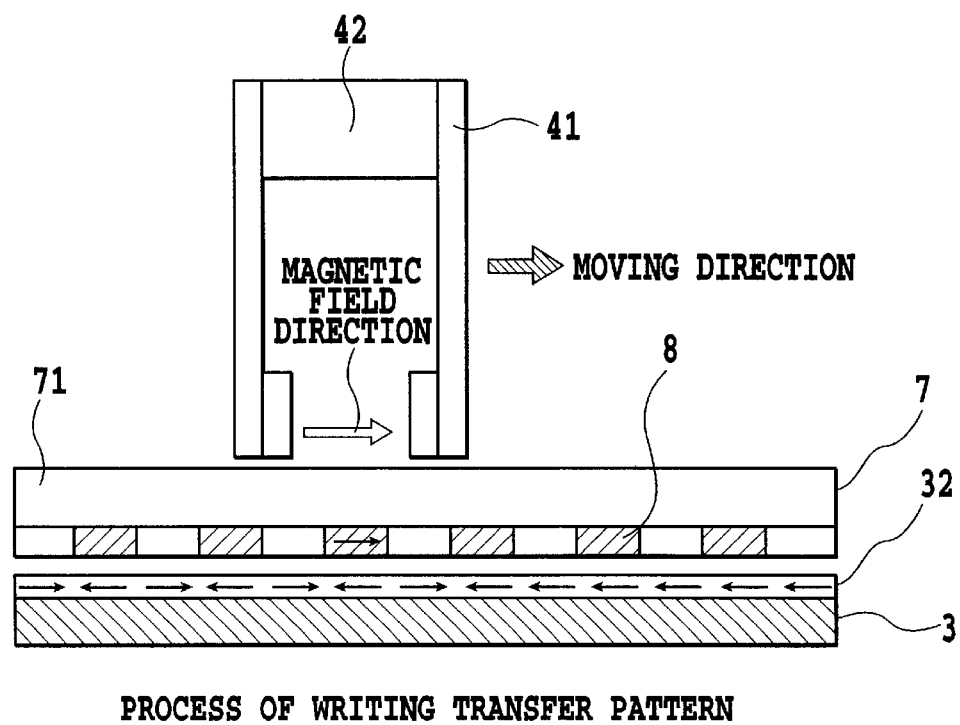
Figure 9:
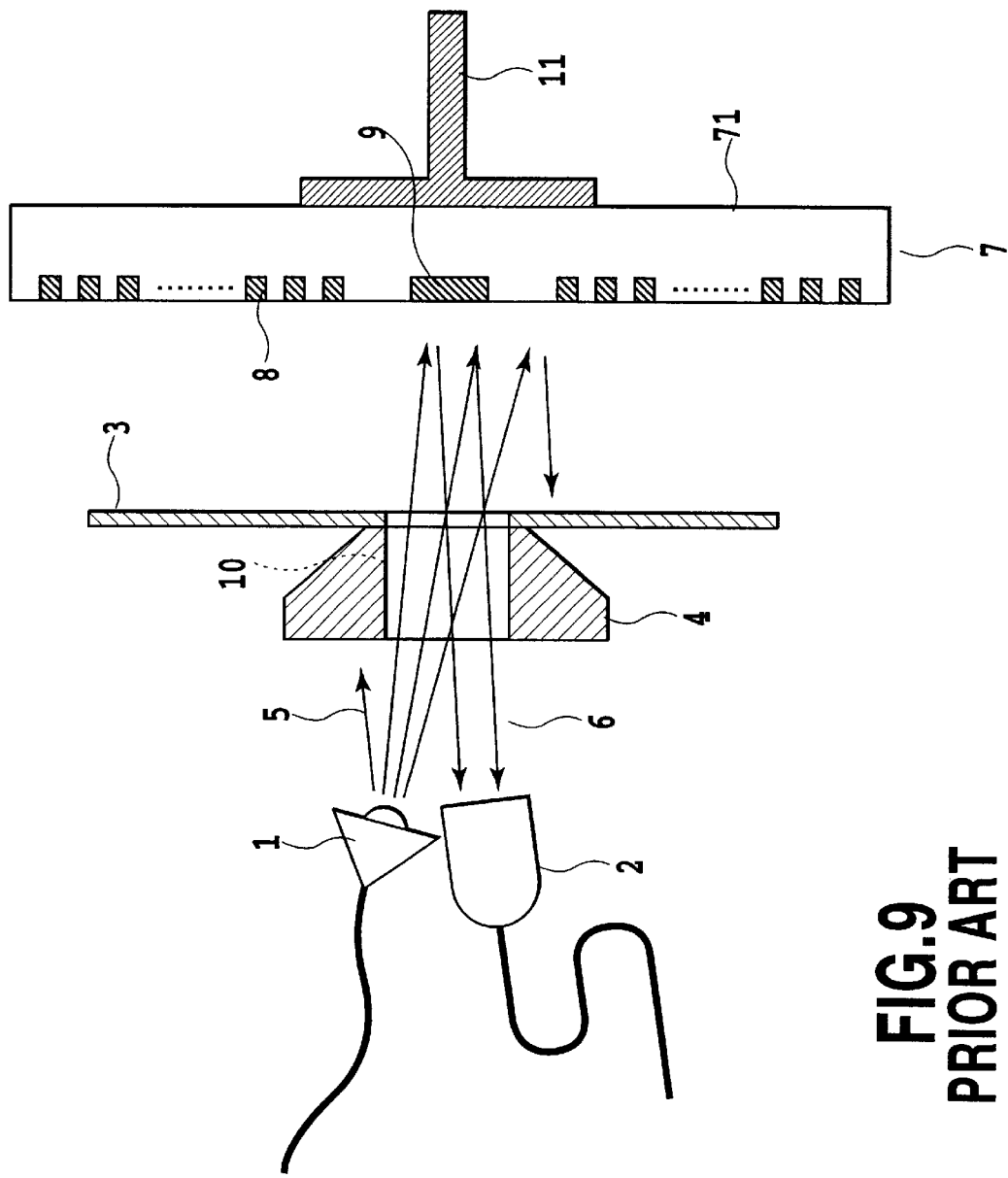
FIG. 9 shows an example of the configuration of the master disk positioning mark recognition apparatus according to the conventional technology.
Figure 10A:
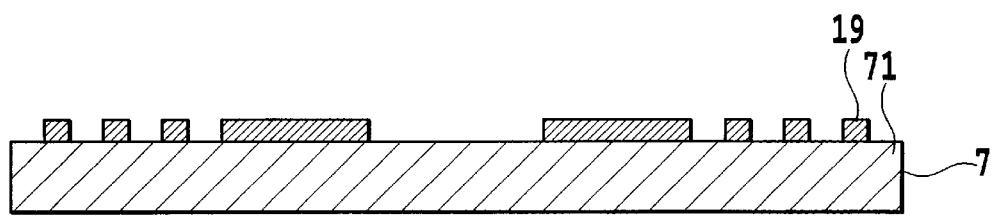
FIGS. 10A to 10D are sectional views of the process of producing a master disk according to the conventional technology.
Figure 10B:
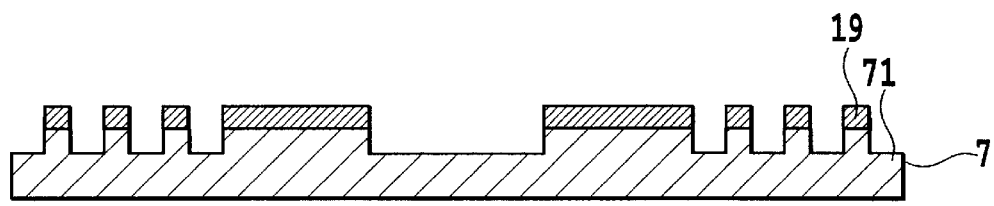
Figure 10C:
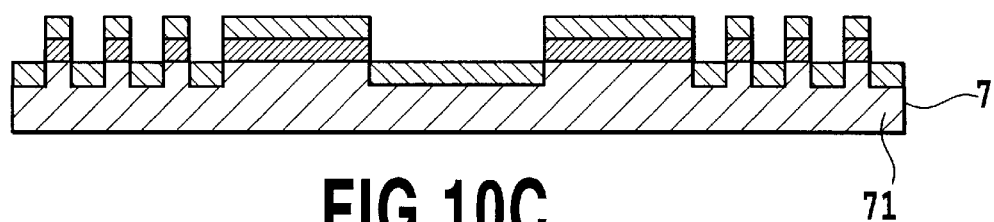
Figure 10D:
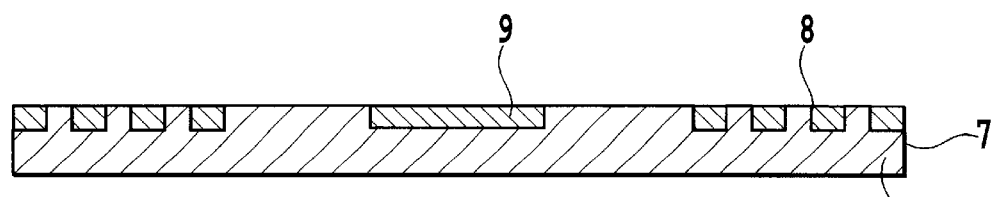
Figure 11A:
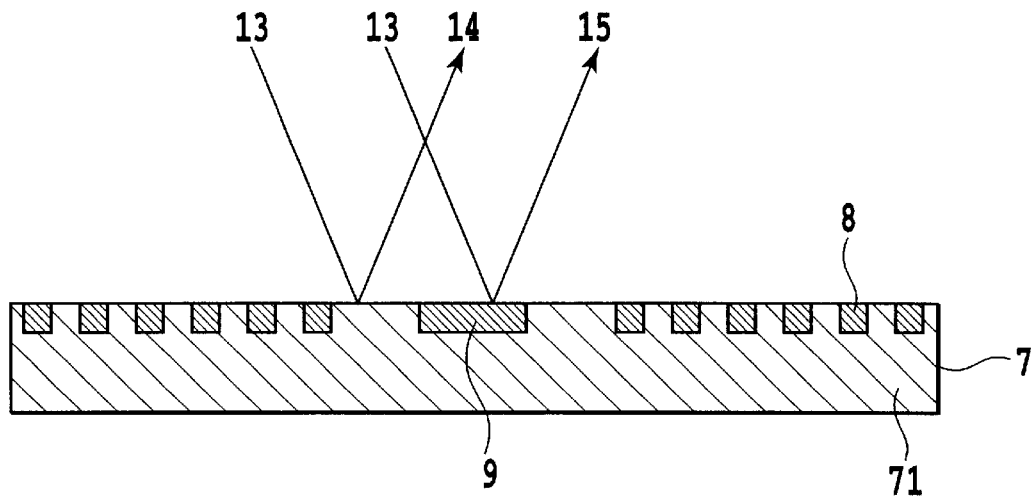
FIGS. 11A and 11B are sectional views illustrating the problem of the conventional technology to be solved by the present invention.
Figure 11B:
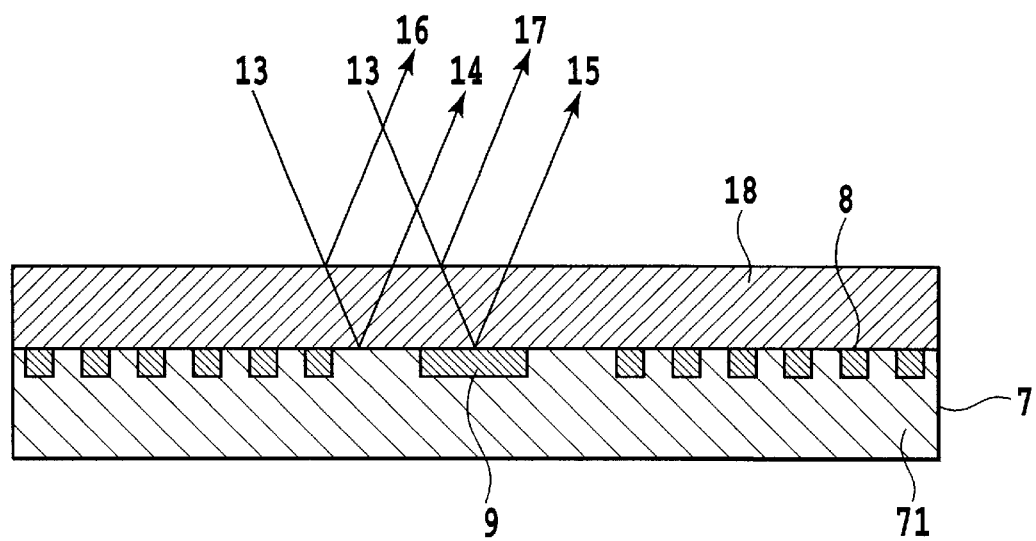

In the process shown in FIG. 6A, after forming the aluminum silicide film (aluminum containing about 2% of silicon) 20 of about 100 nm on the surface of the silicon substrate 71 in the sputtering method, the photo resist 19 of up to 0.5 μm is applied onto the aluminum silicide film 20, and then exposure and development are performed using a photo mask. As a result, the pattern 9 which is a positioning mark is formed in the center of the master disk.

In and subsequent to the processes shown in FIGS. 6B to 6E, the process of embedding the soft magnetic pattern 8 into the silicon substrate 71 is performed as in the method of the conventional technology shown in FIG. 10. The materials of the thin film other than aluminum silicide are pure aluminum, silicon oxide film, pure chrome, etc.

According to the sixth embodiment, the material of the positioning mark 9 can be selected on the basis of such that only the reflectance from the master disk substrate (for example, silicon substrate) 71 can be largely different by performing the process of patterning the positioning mark 9 independent of the process of patterning the soft magnetic layer 8.

The present invention has been described in detail with respect to preferred embodiments, and it will now be apparent from the foregoing to those skilled in the art that changes and modifications may be made without departing from the invention in its broader aspect, and it is the intention, therefore, in the apparent claims to cover all such changes and modifications as fall within the true spirit of the invention.

What is claimed is:

1. A method of recognizing a master disk positioning mark by having a center of a magnetic medium of a magnetic recording disk matching and closely touching a center of a soft magnetic pattern concentrically set around a center of a master disk in order to magnetically transfer servo information written in the soft magnetic patterns to a magnetic recording layer on a surface of the magnetic recording disk by externally applying a magnetic field to the master disk, which is a non-magnetic substrate, and on which the linear and cyclical soft magnetic patterns of independent soft magnetic materials are embedded on a surface or a part of the surface of the magnetic disk, touching or close to the magnetic recording disk, comprising the steps of:

setting a positioning mark formed for recognition of a position on the master disk, irradiating the positioning mark by a beam of a light source, image-recognizing a reflected light from around the positioning mark using an optical reception sensor, and positioning the master disk based on the recognition of the image; and limiting a wavelength of a light used to recognize the positioning mark to a specific range such that the intensity of the reflected light from a diamond-like carbon (DLC) film of an upper surface of the master disk can be minimized, and a ratio of the intensity of the reflected light from a surface of a lower substrate of the master disk to the intensity of the reflected light from the positioning mark can be maximized.

2. The method according to claim 1, wherein said range of the wavelength of the light reaching the optical reception sensor is selected using a wavelength selection filter.

3. The method according to claim 1, wherein a light from the light source within a limited wavelength area as the light source is emitted to the positioning mark, and a reflected light from the positioning mark is received by the optical reception sensor.

4. The method according to claim 1, wherein a light from a polarized light source within a limited wavelength area as the light source is emitted to the positioning mark, and a reflected light from the positioning mark is received by the optical reception sensor through a polarization filter.

5. A method of recognizing a master disk positioning mark by having a center of a magnetic medium of a magnetic recording disk matching and closely touching a center of a soft magnetic pattern concentrically set around a center of a master disk in order to magnetically transfer servo information written in the soft magnetic patterns to a magnetic recording layer on a surface of the magnetic recording disk by externally applying a magnetic field to the master disk, which is a non-magnetic substrate, and on which the linear and cyclical soft magnetic patterns of an independent soft magnetic materials are embedded on a surface or a part of the surface of the magnetic disk, touching or close to the magnetic recording disk, comprising the steps of:

setting a positioning mark formed for recognition of a position on the master disk, irradiating the positioning mark by a beam of a light source, image-recognizing a reflected light from around the positioning mark using an optical reception sensor, and positioning the master disk based on the recognition of the image; and using one material for the positioning mark formed for recognizing a position on the master disk and another different material for the soft magnetic pattern.

6. The method according to claim 5, wherein a film forming process for the positioning mark is added on a film forming process for a soft magnetic pattern added on a master disk producing process, and a material having a different reflectance from a material of a substrate of the master disk is selected as a material of the positioning mark from among non-soft magnetic materials in the film forming process for the positioning mark.

* * * * *